United States Patent [19]

Carper et al.

[11] Patent Number: 5,857,211
[45] Date of Patent: Jan. 5, 1999

[54] SYSTEM FOR AUTOMATICALLY DETECTING CYCLICAL AND RECURSIVE LINKS BETWEEN DOCUMENT COMPONENTS

[75] Inventors: Craig Carper, San Jose; Shui Wing (Vincent) Lo, San Francisco; Kurt Piersol, Santa Cruz, all of Calif.

[73] Assignee: Apple Computer, Inc., Cupertino, Calif.

[21] Appl. No.: 593,419

[22] Filed: Jan. 29, 1996

[51] Int. Cl.⁶ .................................................. G06F 15/00
[52] U.S. Cl. ............................................................ 707/515
[58] Field of Search ................................. 395/761, 772, 395/614; 707/501, 511, 514, 515

[56] References Cited

U.S. PATENT DOCUMENTS

| | | | |
|---|---|---|---|
| 4,789,982 | 12/1988 | Coden | 370/451 |
| 4,982,344 | 1/1991 | Jordan | 395/346 |
| 5,355,472 | 10/1994 | Lewis | 395/612 |
| 5,499,369 | 3/1996 | Atkinson | 395/380 |
| 5,546,519 | 8/1996 | Berry | 395/326 |
| 5,634,064 | 5/1997 | Warnock et al. | 395/774 |
| 5,634,124 | 5/1997 | Khoyi et al. | 395/614 |

Primary Examiner—Joseph R. Burwell
Attorney, Agent, or Firm—Burns, Doane, Swecker & Mathis, L.L.P.

[57] ABSTRACT

In a system which permits different components of a document to be linked, a unique token is associated with a change to data in the source of a link. The token is passed with a command to update linked data. Each destination object keeps track of the token associated with the last change made to its linked data. When a new command to update linked data arrives at the destination object, the token for that update is compared with the token for the previous update. If the tokens are the same, an alert is presented to the user to indicate that either the change has been propagated around a cycle, or more than one update path exists between the source object and the destination object. In response, the user can elect to prevent the change from being carried out in the destination object, in which case the cycle is broken. Alternatively, the user can elect to let the update continue, for example in those situations in which multiple update paths are desirable.

24 Claims, 5 Drawing Sheets

⚠ Editing a link source has caused an update loop.

Press Stop to interrupt updating, or press Update to continue.

[ Stop ]  [ Update ]

SYSTEM FOR AUTOMATICALLY DETECTING CYCLICAL AND RECURSIVE LINKS BETWEEN DOCUMENT COMPONENTS

FIELD OF THE INVENTION

The present invention is directed to document processing systems which permit data links to be established between different documents, or different components of a document, and more particularly to a system for automatically alerting a user to the presence of undesirable cyclical and recursive data link structures, to prevent runaway update processes that might be caused by such structures.

BACKGROUND OF THE INVENTION

Many different types of document processing systems permit users to establish data links between different documents, or different components of the same document. A link is a dynamic relationship between an original item of data and a copy of that item. Unlike a static copy of the item, the linked copy is updated whenever the original data changes. For example, a user may create a spreadsheet of data, and link all or a portion of the spreadsheet data to a bar chart which illustrates the relationships of the linked data. In this situation, the spreadsheet is labelled as the source for the linked data, and the chart is identified as the destination for the linked data. Within the spreadsheet, the data is displayed as values in cells, whereas in the chart the data appears as bars of different lengths. Whenever the data in the spreadsheet is subsequently updated, the chart to which it is linked can also be updated automatically, without requiring any intervention on the user's part. Thus, as the numerical values in the cells of the spreadsheet are incremented or decremented, the bars on the chart automatically grow or shrink accordingly.

The number of links that can be made within a document or series of documents is potentially unbounded. For example, in addition to being linked to the bar chart, the same data from the spreadsheet can also be linked to a text document created with a word processing program. A portion of the text document that contains the linked data may itself be linked to another document, e.g. a desktop publishing document or a slide presentation. Whenever the original data in the spreadsheet is updated, the update is passed along to each of the other documents to which it is linked.

This capability to create a potentially unlimited number of links can sometimes lead to unintended results. One such situation is the creation of cyclic links. In this situation, data is linked from a source component of a document to a destination component. Through the creation of other links, the destination component is linked back to the source component, either directly or indirectly. In a system in which updates are carried out automatically, when a change occurs in the source component, it is passed along to the destination component, and then back to the source component through the other links. At the source component, the change is acknowledged, and passed on to the destination component for the second time. It can be seen that, in this situation, the change can be continually passed between the source and destination components in an unending cycle. This is likely not what was intended by the user. It can cause the link structure to update indefinitely or, due to practical limitations on memory or file size, abort due to resource exhaustion.

A similar situation exists for the case of recursive links. In this case, the destination of a link is embedded within the source of the link. When the linked data is changed, the change is passed on to the destination. Whenever a change occurs in the destination, it provides a notification to the component in which it is embedded, in this case the link source. Consequently, a link update is passed from the destination to the source, which again propagates the update along the link. As in the case of the cyclic link structure, the updating process can go on indefinitely.

It is quite possible that the user is unaware that a recursive or cyclic link arrangement has been created, particularly if the various links are created at different times or by different people. It is desirable, therefore, to provide a mechanism by which a user can be alerted to the fact that a potential error-causing link structure has been set up, and thereby take corrective action.

SUMMARY OF THE INVENTION

In accordance with the present invention, the foregoing objective is achieved by associating a unique token with a change to data, and passing the token with a command to update linked data. Each destination object keeps track of the token associated with the last change made to its linked data. When a new command to update linked data arrives at the destination object, the token for that update is compared with the token for the previous update. If the tokens are the same, this is an indication that either the change has been propagated around a cycle, or there is more than one update path between the source object and the destination object. In such a case, an alert is presented to the user. In response, the user can elect to prevent the change from being carried out in the destination object, in which case the cycle is broken. Alternatively, the user can elect to let the update continue, for example in those situations in which multiple update paths are desirable.

If the user elects to let the update continue, this fact is stored for that particular link, and a threshold is established for the number of times an update can occur with the same token. The next time that situation occurs, e.g. the same update notification appears twice on the link, no alert is provided, since the user has indicated that a second update with the same token is acceptable. However, if the same update notification appears for a third time, the alert is displayed again. The user has the choice to continue or discontinue the update. If the user elects to continue, the threshold is increased. Each time a new threshold is reached, the alert is presented. If the user chooses to discontinue the updates, the threshold can be rest to zero. In this way, the system adapts to the choices of the user and to changes in the arrangement of links.

With this approach, the user is automatically alerted to the presence of potentially undesirable link structures, and can take the appropriate corrective action without having the computer hang up due to an endless update loop.

The foregoing features of the invention, and the advantages provided thereby, are explained in detail hereinafter with reference to an exemplary embodiment illustrated in the drawings.

DETAILED DESCRIPTION

There are a variety of ways in which data links can be established between a source and a destination. For example, some document processing programs allow links to be set up between different portions of a document having the same type of content, e.g. a paragraph on one page of a text document might be linked to a textual appendix for the same document. As another possibility, links can be established between objects that have different types of content. For example, a document might have both a graphic object and a text object, and a portion of the graphic object can be linked to the text object. This might be done through the auspices of a user interface that is based on a component architecture. One example of such a user interface is described in U.S. patent application Ser. No. 08/058,260, filed May 10, 1993, now U.S. Pat. No. 5,812,862. In this particular user interface, individual objects are embodied in parts. For example, a document might contain a text part, a graphic part, a spreadsheet part, etc. Each part is an autonomous object whose specific contents are unknown to the user interface and the other parts. The user interface permits links to be established between different parts. However, it is unaware of the particular objects within the parts that form the source and destination for a link. In addition, the details of links that are set up within a part itself may also be unknown to the user interface. In such an environment, it is quite possible for one or more users to set up an arrangement which contains recursive or cyclic links.

To facilitate an understanding of the present invention, it will be explained in the context of its application in a user interface which employs parts as the basic components of a document. It will be appreciated, however, that the principles of the invention are not limited to this particular implementation. Rather, they can be employed in any situation in which the possibility exists that cyclic or recursive links might be unintentionally set up by a user.

The present invention is directed to the linking of data in a computer, for display on a display device, such as a monitor, and/or printing in a document. While the particular hardware components of a computer system do not form a part of the invention itself, they are briefly described herein to provide a thorough understanding of the manner in which the features of the invention cooperate with the components of a computer system to produce the desired results.

Figure 1:
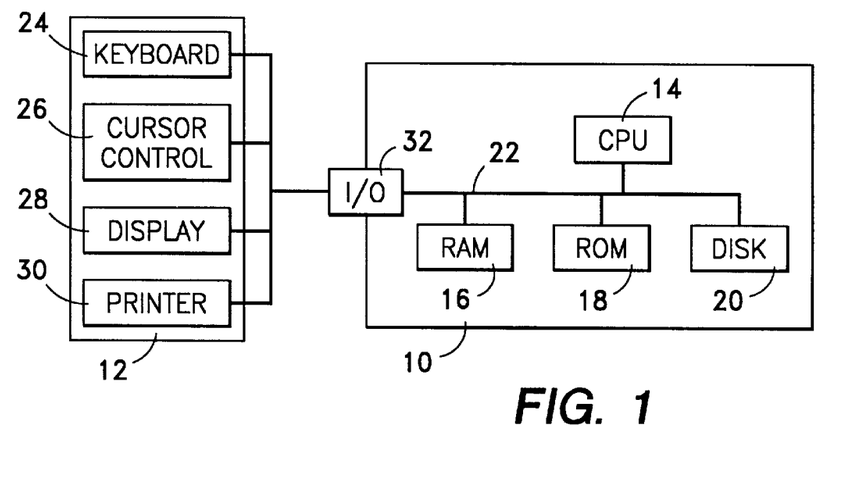
FIG. 1 is a general block diagram showing the main components of a computer system.

Referring to FIG. 1, the computer system includes a computer 10 having a variety of external peripheral devices 12 connected thereto. The computer 10 includes a central processing unit 14 and associated memory. This memory generally includes a main memory which is typically implemented in the form of a random access memory 16, a static memory that can comprise a read only memory 18, and a permanent storage device, such as a magnetic or optical disk 20. The CPU 14 communicates with each of these forms of memory through an internal bus 22. The peripheral devices 12 include a data entry device such as a keyboard 24, and a pointing or cursor control device 26 such as a mouse, trackball, pen or the like. A display device 28, such as a CRT monitor or an LCD screen, provides a visual display of the information that is being processed within the computer, for example the contents of a document or a computer-generated image. A hard copy of this information can be provided through a printer 30, or similar such device. Each of these external peripheral devices communicates with the CPU 14 by means of one or more input/output ports 32 on the computer.

Typically, in the operation of the computer, one or more documents are created with programs that are running on the computer, and stored in its main memory 16. The documents are displayed on the computer's display device 28, and can be printed on the printer 30. In the context of the following description, a document can be a compound document which is comprised of multiple parts, each of which has a different type of content. These parts are stored in the main memory 16 of the computer, where they are manipulated by the user. Data from one part can be linked to another part.

Figure 2A:
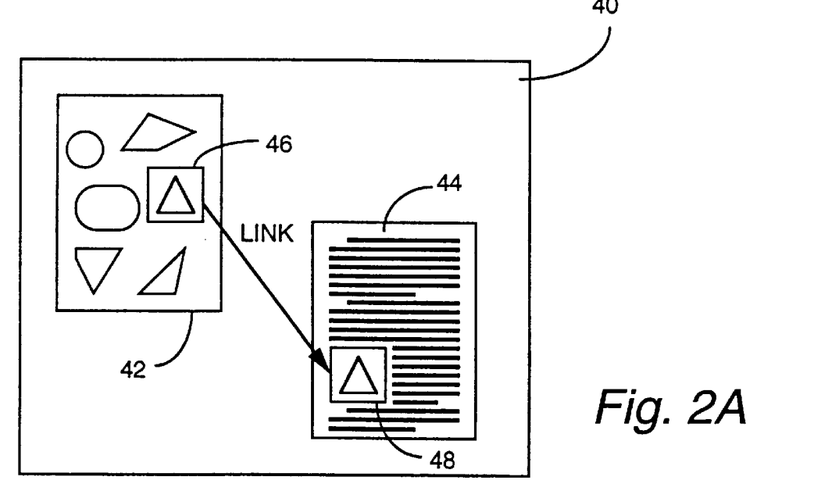
FIGS. 2A and 2B are schematic representations of a link between two document parts.
Figure 2B:
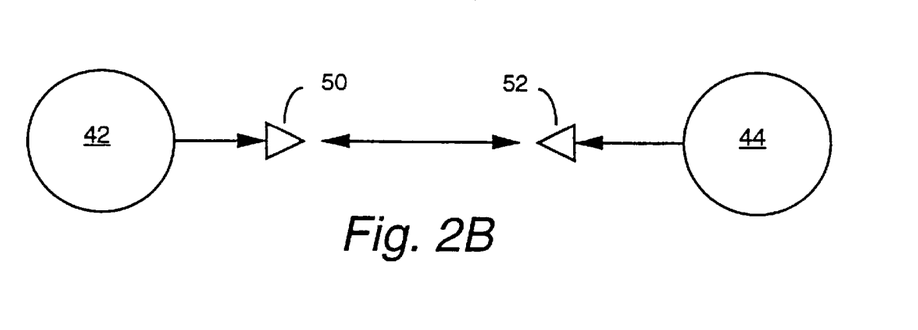

An example of a link between two parts is illustrated in FIGS. 2A and 2B. FIG. 2A schematically illustrates how the link appears to the user on the display 28, and FIG. 2B depicts the underlying functionality within the memory 16 of the computer. A document 40 is comprised of two different parts 42 and 44, for example a graphic part and a text part. Although illustrated as being on the same displayed page of the document in FIG. 2A, these two parts can appear on different pages or even in different documents. The part 42 contains data 46 which forms the object of a link. This data is linked to the part 44, which displays a copy 48 of the linked data. Whenever the data in the source part 42 is changed, the display of the copy 48 in the part 44 needs to be updated. This updating can be carried out manually, i.e. in response to a command from the user to implement an update, or automatically, in which case the display in the part 44 is updated immediately after it occurs in the part 42. In the following discussion, it will be assumed that updates occur automatically.

FIG. 2B illustrates the manner in which a link is implemented in the operating system, or user interface, for the computer 10. Whenever a link between parts is established by a user, two link objects are created by the operating system or user interface and stored in the memory 16. One link object, labelled the link source object 50, is referenced by the part which forms the source for the link, in this case the part 42. The other link object is the link destination object 52, which is referenced by the part 44. The two link objects communicate with one another to establish the link between the parts. In essence, each link object is a data structure having certain functionality associated with it. Whenever a change occurs in the linked data, the part 42 passes the change information on to the referenced link source object 50. In response, the link source object 50 passes the change information to the link destination object 52, which provides it to the part 44, to cause the update.

Figure 3A:
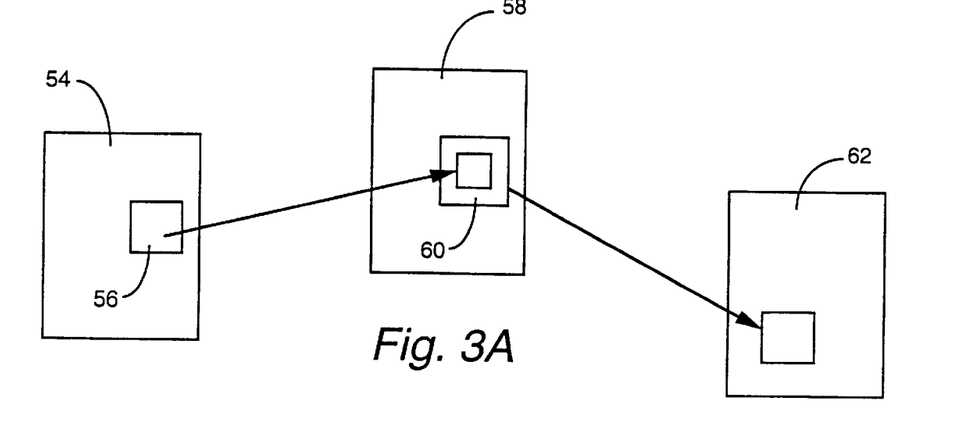
FIGS. 3A and 3B are schematic representations of a multiple link structure.
Figure 3B:
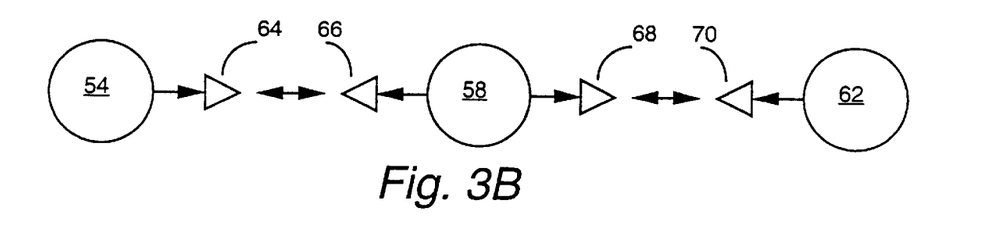

FIGS. 3A and 3B illustrate another example, in which the destination of one link is contained within the source of another link. In this example, a part 54 contains an object 56 which is linked to a second part 58. The linked data from the first part 54 is contained in an object 60 in the second part. The object 60 forms the source of another link to a third part 62. Referring to FIG. 3B, the part 54 references a link source object 64. The second part 58 references a link destination object 66 for the link between the two parts. In addition, the part 58 references another link source object 68. Its corresponding link destination object 40 is referenced by the part 62.

When a change occurs in the object 56, a notification of that change is provided to the part 58, via the link objects 64 and 66. Since this change occurs within the object 60, the change notification is also passed along to the part 62, via the link objects 68 and 70. Although the data that is transmitted to the part 62 may not be exactly the same data that was passed to the part 58, the same notification is passed along both links, since it is the original change which causes the generation of the notification.

From the foregoing, it can be seen that data can be linked among parts in a variety of ways, and the overall structure of the links can become quite complex. The various parts are autonomous of one another, as a result of which the particular objects that form the sources and destinations of links are unknown outside of the parts themselves. Consequently, there is no one mechanism which has awareness of the entire structure of the links. It is possible that a user could create an arrangement of links which brings about unintended results. Two examples of such are cyclic links and recursive links. Because of the autonomous nature of parts, these situations cannot be readily detected.

Figure 4A:
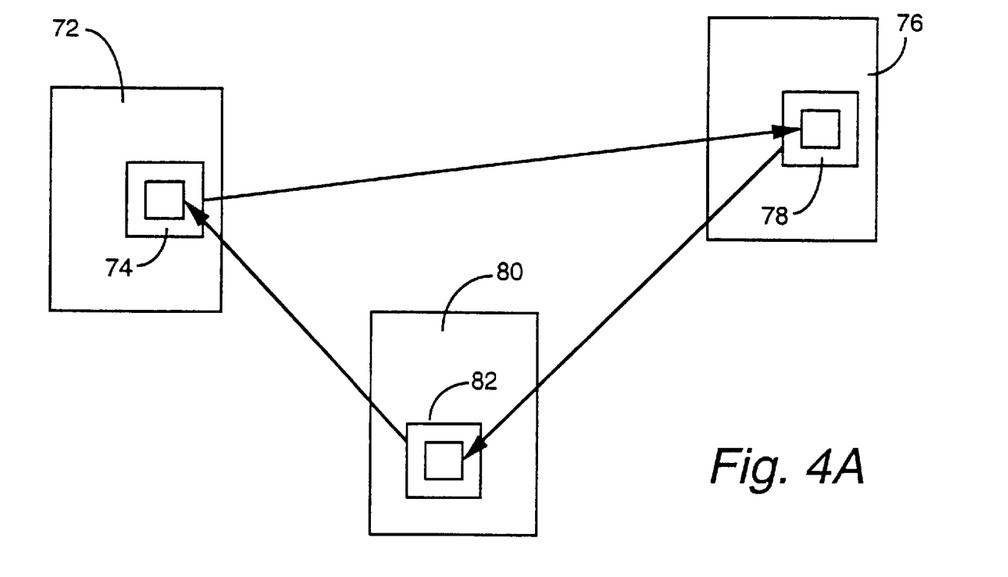
FIGS. 4A and 4B are schematic representations of a cyclic link structure.
Figure 4B:
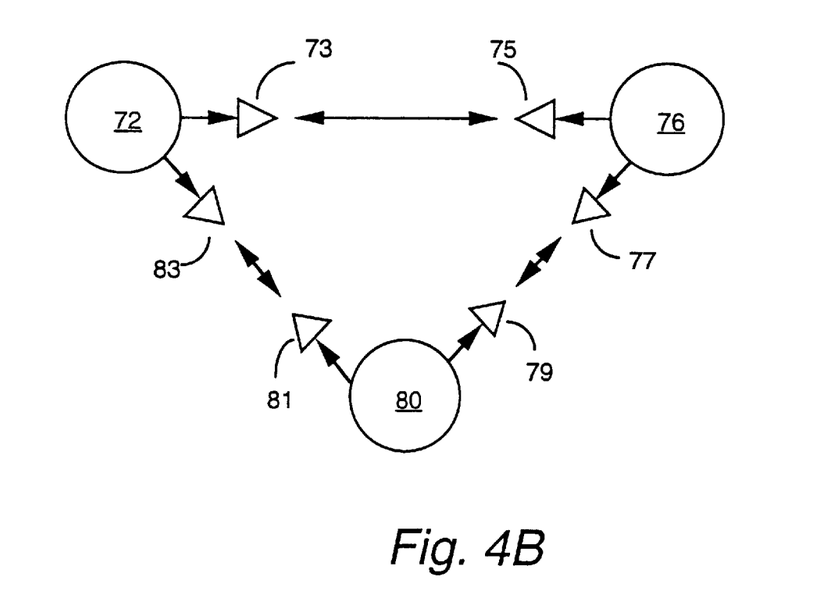

An example of a cyclic link is illustrated in FIGS. 4A and 4B. A part 72 contains an object 74 which forms the source of a first link, between the part 72 and another part 76. The part 76 contains an object 78 in which the linked data from the first link is embedded. This object forms the source of a second link between the part 76 and a third part 80. The part 80 contains an object 82 which includes the linked data from the second link. This object forms the source of a third link between the part 80 and the first part 72. The linked data of the third link is contained in the object 74 which forms the source of the first link.

In operation, when data in the object 74 is changed, a notification of the change is sent over the first link to the second part 76. Since this change occurs within the object 78, the change notification is passed along the second link to the part 80. In a similar fashion, the change occurs within the object 82, and so it is passed over the third link to the first part 72. Since this change occurs within the object 74, the change notification is again passed over the first link to the second part 76. It can be seen that the change notification continues to be passed among the three parts 72, 76 and 80 in an endless loop, until some event happens to break the updating process. In the absence of user intervention, the computer can endlessly continue to update, which might appear to the user as if it has crashed or hung up.

Figure 5:
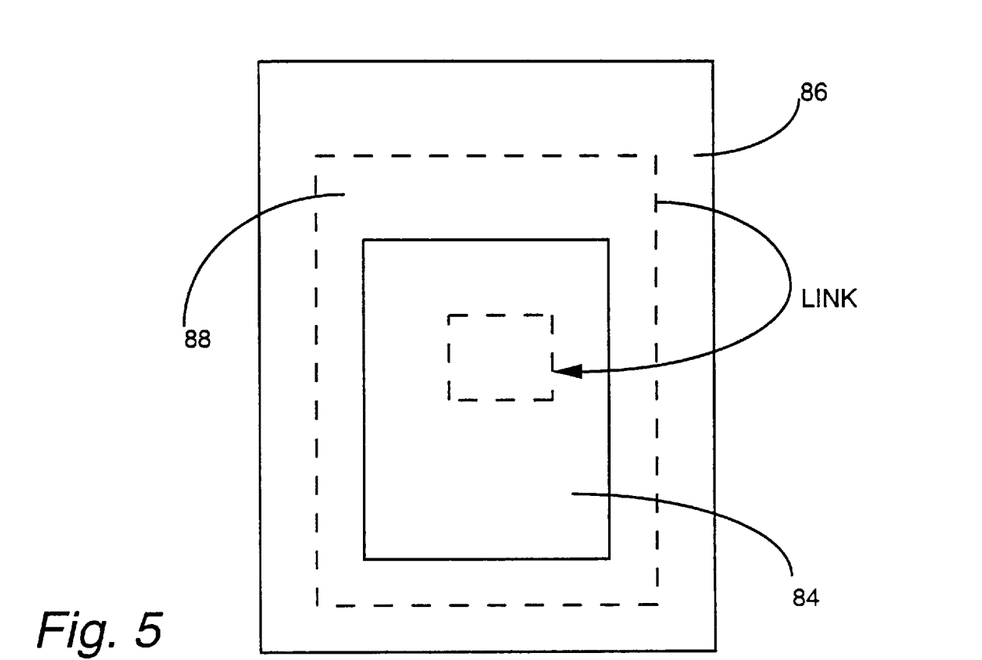
FIG. 5 is a schematic representation of a recursive link arrangement.

It is not necessary for multiple links to be interconnected to produce an undesirable result. A similar situation can occur in the case of a recursive link, which is schematically illustrated in FIG. 5. In this case, a part 84 which forms the destination of a link is embedded within another part 86 containing an object 88 that is the source of the link. For example, a bar chart could be embedded within a spreadsheet that forms the source of the linked data. When data in the object 88 is changed, a link update is provided to the part 84. This link update includes a notification that a change has occurred, along with the changed data. In response, the part 84 passes the notification along to its container part 86, to inform it that a change has occurred. Since this change occurred within the object 88 that is the source of a link, the change notification is again sent over the link. It can be seen that, as in the case of the cyclic link, the change notification will continue to be passed between the two parts in an unending loop, unless the update path is broken.

In accordance with the present invention, such a situation can be prevented by monitoring link updates and detecting when the same change is presented multiple times over the same link path. In operation, whenever a change occurs in an object which forms the source of a link, the change in the data is recorded, and a unique token is assigned to the change. This unique token could be a sequential number that is assigned by the part each time a change is made, for example. To assure uniqueness of the token across all parts and documents that can participate in a link update, the token is preferably created at the operating system level. The recording of the changed data and assignment of an token might be associated with other functions in a part as well, for instance an "Undo" command which is found in many user interfaces. When an update occurs, the token that is passed along the link with the changed data itself. When a link source object, such as the link source object 73 for the first link in the example of FIGS. 4A and 4B, receives a link update, it stores the update token and passes the update information, including the changed data and the token, on to the link destination object 75. The changed data and the token are similarly passed on to the other links, and the token is stored at each of the link source objects 77 and 81.

The next time that the link source object receives an update, it compares the token for the new update with the token stored from the previous update. If the two tokens are the same, as would occur in the case of FIGS. 4A and 4B, this provides an indication that the same change is appearing more than once, and an unintended cyclic or recursive link structure may exist. In response, appropriate corrective action can be taken.

Figure 6:
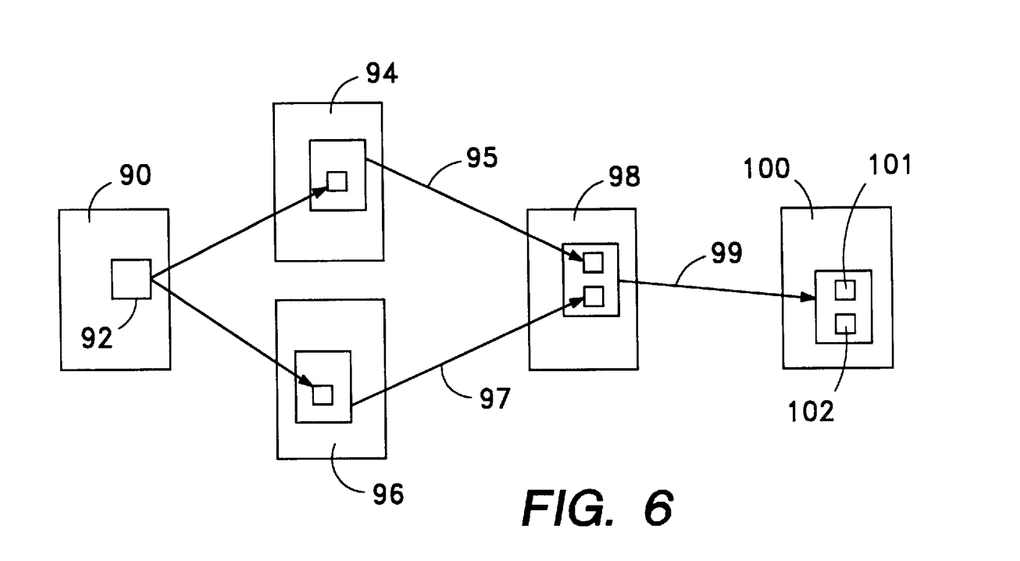
FIG. 6 is a schematic representation of a link structure with dual update paths.

If a second update of a link is always undesirable, the most appropriate action may be to automatically stop the update process. For example, the link source object 73 can discard any update information that is received two or more times, rather than pass it along to the link destination object 75. However, there may be some situations in which the user might wish to have two updates travel over the same path. One example of such a situation is illustrated in FIG. 6. Referring thereto, an object 92 in a source part 90 is linked to two different destination parts 94 and 96. For example, the original part 90 might be a spreadsheet part, the first destination part 94 might be a text part, and the second destination part 96 might be a bar chart part. Objects in each of these two latter parts are linked to another part 98, for example a desktop publishing document, via two links 95 and 97. Finally, an object from the part 98 which encompasses the linked data from each of the parts 94 and 96 is linked to a final destination part 100, via a link 99.

When a change occurs in the linked object 92, a notification regarding that change is passed on to each of the parts 94 and 96. In turn, each of these two parts passes the change notification on to the part 98. This part receives two separate change notifications in this arrangement, one over each of the links 95 and 97. In response, therefore, the part 98 passes two separate change notifications on to the part 100, via the link 99, even though both notifications relate to the same change of data. Consequently, the link source object for the link 99 will see the same update token twice.

In this situation, the dual notices over the same link are desirable, since they actually relate to two separate objects in the final destination part 100, e.g. a text object 101 and a chart object 102, both of which should be updated. In such a case, therefore, it is not appropriate to automatically stop the update process after the first update notification is received. In the preferred embodiment of the invention, when the same update token appears on a link for a second time, the link source object which detects the second occurrence of the token causes an alert to be displayed to the user on the display device 28. This might be carried out by sending an appropriate message to the operating system, for example, in which case the operating system can cause an alert message such as that shown in FIG. 7 to be displayed. This alert can give the user the option of stopping the update, in which case the link source object does not pass the update information on to the link destination object, or to allow it to continue.

Figure 7:
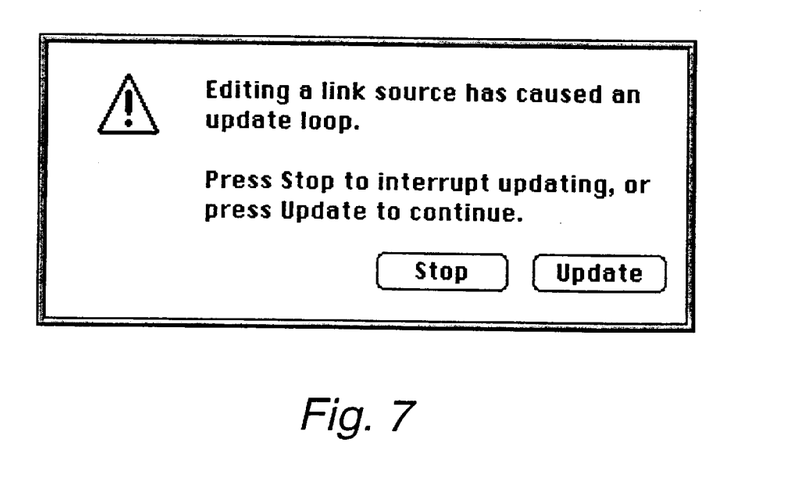
FIG. 7 is an illustration of an alert window.

If the user indicates a preference to continue with the update, the changed data is again passed on to the link destination object corresponding to the link source object that caused the alert to be displayed, and the update carried out. In response to such an indication by the user, the link source object records the fact that the user has elected to continue with the update. This information can be used in connection with future updates. Specifically, once the user indicates that two updates with the same change data are acceptable, there is no need to subsequently present the alert to the user when the same update token is received two times at a link source object. Thus, when this situation is detected on future updates, the update procedure is allowed to continue without alerting the user.

Figure 8:
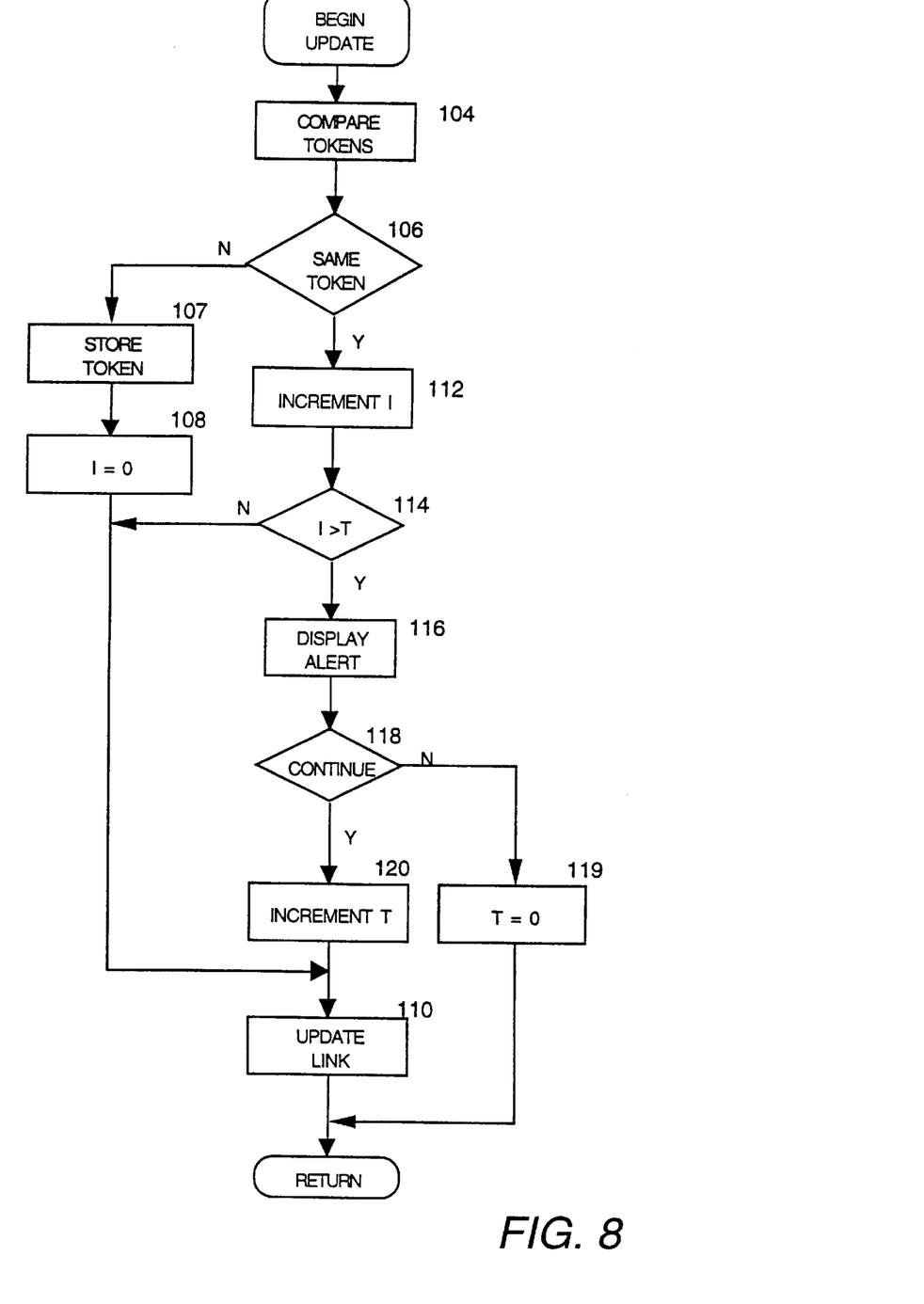
FIG. 8 is a flowchart of the process carried out in accordance with the present invention.

The procedure that is carried out by the present invention is depicted in the flow chart of FIG. 8. This procedure is carried out within each link source object. Referring to FIG. 8, whenever an update is carried out, the link source object compares the token for the update with the stored token from the previous update, at Step 104. At Step 106, a determination is made whether the two tokens are the same. If not, the new token is stored at Step 107, an index counter I is reset to 0 at Step 108, and the update process continues in the normal manner at Step 110.

If, however, a determination is made at Step 106 that the two tokens are the same, the index counter I is incremented at Step 112. A determination is then made at Step 114 whether the value of the index counter I is greater than a threshold value T. When the link is first created, the threshold value T is equal to 0. Consequently, the decision at Step 114 will be positive, causing the alert message to be displayed at Step 116. The user's response to the alert message is detected at Step 118. If the user elects to stop the update process, the link source object returns control to the main system, and the update procedure is halted, i.e. the changed data is not passed on to the link destination object and the threshold value T is reset to zero at Step 119. If, however, the user elects to continue with the update, the threshold value T is incremented at Step 120. Thereafter, the update procedure is carried out in the normal manner at Step 110.

In operation, therefore, the first time that an update token is detected which is the same as the token for a previous update operation, an alert message is displayed to the user. If the user elects to continue with the update, the threshold value T is incremented to a value of 1. Subsequently, if the same situation should occur, i.e. the same update token is seen twice in row, the user will not be alerted since he has already indicated acceptance of this situation. If, however, the update token is seen for a third time, the alert will again be displayed because the index value I will be greater than the threshold value. If the user elects to continue with the update again, the threshold value is again incremented. During subsequent updates, the user will not be alerted unless the same token appears four times in a row. Thus, the present invention is able to adapt to the user's selections, and accommodate those situations in which multiple updates over the same link are desirable, such as the example shown in FIG. 6.

When a link source object is first created, upon setting up a link, a state variable is established for recording the token of the last update. To assure proper operation, this state variable should initially have a unique token value, e.g. all zeroes, so that a match will not occur at Step 106 during the first link update. Similarly, the state variable for the threshold value T should initially be set to zero when the link source object is created, so that an alert will be displayed when the first double-update occurs.

From the foregoing, it can be seen that the present invention provides a system for detecting multiple updates over the same link, which might be caused by cyclic or recursive link structures. Even if such a structure exists, the user can choose to continue with an update of any desired number of iterations, for example to see what effects the multiple updates have on a document, and whether the updates subside on their own. If they do not, the user can eventually elect to discontinue the update process. Thus, the system is able to accommodate multiple link updates that are intended by the user. Further in this regard, the accommodation of the user's desires is adaptive, so that the user is not unnecessarily alerted to the existence of multiple updates once such a situation has been accepted.

In the preceding described embodiment of the invention, only the token for the most recent link update is stored for comparison with the next link update. In some situations, it may be desirable to compare the current update token with those for two or more previous link updates. For example, in a preemptive multiprocessing environment, it is possible that concurrently processed link updates could interleave with one another. In such a case, two concurrent updates could interleave in such a way that two successive transmissions of the same update token over a link, which might be due to a cyclic link structure, are separated by a different token associated with a concurrently running process. In such a situation, comparison of a token with only the immmediately preceding token would not detect the cyclic link structure.

Therefore, it may be preferable to employ a cache memory which stores a small number of the most recently received tokens. When an update token is presented to the link source object, it can be compared to all of the tokens in the cache memory to detect a cyclic or recursive link structure. The tokens can be stored in the cache memory in order from most recent to least recent, and if a token is not seen after a predetermined number of link update cycles, it can be dropped from the cache memory. With this approach, the likelihood is substantially decreased that interleaved update cycles will go undetected. The size of the token cache can be adjusted to accomodate various usage patterns and link structures.

Accordingly, it will be appreciated by those of ordinary skill in the art that the present invention can be embodied in other specific forms without departing from the spirit or essential characteristics thereof. The presently disclosed embodiments are therefore considered in all respects to be illustrative, and not restrictive. The scope of the invention is indicated by the appended claims, rather than the foregoing description, and all changes that come within the meaning and range of equivalents thereof are intended to be embraced therein.

What is claimed is:

1. A method for detecting the existence of a cyclic link structure in a document processor of a type which enables data in one component of a document to be linked to another component of a document, comprising the steps of:

detecting a change in data which is linked from a source document component to a destination component;

assigning a token to the detected change;

updating a link associated with the changed data by initiating transmission of the data change to the destination component;

comparing the assigned token to a token associated with a previous update of the link; and displaying a user alert if the two compared tokens are the same.

2. The method of claim 1 wherein said user alert provides a user with options to stop the link update or continue with the link update, and further including the step of interrupting the transmission of the data change to the destination component when the user elects to stop the update.

3. The method of claim 1, wherein each change of data is assigned a new token which is unique to that change.

4. A method for detecting the existence of a cyclic link structure in a document processor of a type which enables data in one component of a document to be linked to another component of a document, comprising the steps of:

detecting a change in data which is linked from a source document component to a destination component;

assigning a token to the detected change;

updating a link associated with the changed data by initiating transmission of the data change to the destination component;

comparing the assigned token to a token associated with a previous update of the link;

presenting a user with an option to continue the link update or stop the link update if the two compared tokens are the same;

interrupting the transmission of the data change to the destination component if the user elects to stop;

setting a threshold value if the user elects to continue, wherein said threshold value identifies a number of successive link updates with the same token in which the user has elected to continue;

counting the number of successive link updates associated with an identical token;

inhibiting the presentation of said user options if the number of successive link updates associated with the identical token is not greater than said threshold value; and transmitting the data change to the destination component when the number of successive link updates associated with the identical token is not greater than said threshold value, to thereby complete the link update.

5. The method of claim 4 further including the step of setting said threshold value to zero if the user elects to stop.

6. A method for detecting the existence of a cyclic link structure in a document processor of a type which enables data in one component of a document to be linked to another component of a document, comprising the steps of:

detecting a change in data which is linked from a source document component to a destination component;

assigning a token to the detected change;

updating a link associated with the changed data by initiating transmission of the data change to the destination component;

comparing the assigned token to a token associated with a previous update of the link; and interrupting the transmission of the data change to the destination component if the two compared tokens are the same.

7. The method of claim 6, wherein each change of data is assigned a new token which is unique to that change.

8. A document processing system, comprising:

means for linking data in a first document component to a second document component to cause the data to be displayed in said second component;

means responsive to a change in said data for assigning a unique token to said data change and for initiating transmission of the token and the changed data to said second document component, to thereby update the display of data in said second component;

means for comparing the token assigned to the update with a token assigned to a previous update; and means for causing an alert message to be displayed to a user if the two compared tokens are the same.

9. The system of claim 8 wherein said user alert provides a user with options to stop the link update or continue with the link update, and further including means for interrupting the transmission of the data change to the second component when the user elects to stop the update.

10. The document processing system of claim 8, wherein each change of data is assigned a new token which is unique to that change.

11. A linked data structure that is stored and executed in the memory of a computer, comprising:

a first document component which contains data and is responsive to changes in said data to provide a notification of a change in said data;

means for assigning a token to a change in said data;

a link source object that is referenced by said first document component and receives said notification and said token;

a link destination object that communicates with said link source object to receive said notification and said token;

a second document component which references said link destination object and displays a copy of said data; and means associated with said link source object for storing a token received with a data change notification, comparing a received token with a stored token from a previous data change notification, and inhibiting the communication of a data change notification to said link destination object if the two compared tokens are identical.

12. The linked data structure of claim 11, wherein each change of data is assigned a new token which is unique to that change.

13. A method for detecting the existence of a cyclic link structure in a document processor of a type which enables data in one component of a document to be linked to another component of a document, comprising the steps of:

detecting a change in data which is linked from a source document component to a destination component;

assigning a token to the detected change;

updating a link associated with the changed data by initiating transmission of the data change to the destination component;

comparing the assigned token to a token associated with a previous update of the link;

displaying a user alert if the two compared tokens are the same;

interrupting the transmission of the data change to the destination component when the user elects to stop the update; and setting an indicator when a user elects to continue with a link update, and transmitting the data change to the destination component to complete a link update.

14. The method of claim 13, wherein each change of data is assigned a new token which is unique to that change.

15. A method for detecting the existence of a cyclic link structure in a document processor of a type which enables data in one component of a document to be linked to another component of a document, comprising the steps of:

detecting a change in data which is linked from a source document component to a destination component;

assigning a token to the detected change;

updating a link associated with the changed data by initiating transmission of the data change to the destination component;

comparing the assigned token to a token associated with a previous update of the link;

displaying a user alert if the two compared tokens are the same, said user alert providing a user with options to stop the link update or continue with the link update;

interrupting the transmission of the data change to the destination component when the user elects to stop the update; and setting an indicator when a user elects to continue with a link update, and transmitting the data change to the destination component to complete a link update.

16. The method of claim 15 further including the step of determining whether said indicator has been set when the two compared tokens are the same, and inhibiting the display of said user alert if the indicator has been set.

17. The method of claim 15 wherein said indicator includes a threshold value which identifies the number of successive link updates in which the user has elected to continue with the same token, and further including the steps of determining the number of successive link updates associated with the same token, and inhibiting the display of said user alert if the determined number of successive link updates is not greater than said threshold value.

18. The method of claim 15, wherein each change of data is assigned a new token which is unique to that change.

19. A document processing system comprising:

means for linking data in a first document component to a second document component to cause the data to be displayed in said second component;

means responsive to a change in said data for assigning a unique token to said data change and for initiating transmission of the token and the changed data to said second document component, to thereby update the display of data in said second component;

means for comparing the token assigned to the update with a token assigned from a previous update;

means for causing an alert message to be displayed to a user if the two compared tokens are the same, said alert providing a user with options to stop the link update or continue with the link update;

means for interrupting the transmission of the data change to the second component when the user elects to stop the update; and means for setting an indicator when a user elects to continue with a link update and for transmitting the data change to the second component to complete a link update.

20. The system of claim 19 further including means for determining whether said indicator has been set when the two compared tokens are the same, and for inhibiting the display of said user alert if the indicator has been set.

21. The system of claim 19 wherein said indicator includes a threshold value which identifies the number of successive link updates in which the user has elected to continue with the same token, and further including means for determining the number of successive link updates associated with the same token, and for inhibiting the display of said user alert if the determined number of successive link updates is not greater than said threshold value.

22. The document processing system of claim 19, wherein each change of data is assigned a new token which is unique to that change.

23. A document processing system comprising:

means for linking data in a first document component to a second document component to cause the data to be displayed in said second component;

means responsive to a change in said data for assigning a unique token to said data change and for initiating transmission of the token and the changed data to said second document component, to thereby update the display of data in said second component;

means for comparing the token assigned to the update with a token assigned from a previous update;

means for causing an alert message to be displayed to a user if the two compared tokens are the same, said alert providing a user with options to stop the link update or continue with the link update; and means for setting an indicator when a user elects to continue with a link update and for transmitting the data change to the second component to complete a link update.

24. The document processing system of claim 23, wherein each change of data is assigned a new token which is unique to that change.

\* \* \* \* \*